United States Patent [19]
Buro

[11] 3,946,400

[45] Mar. 23, 1976

[54] RECORDER FOR ELECTROSENSITIVE RECORD CARRIERS HAVING A SEGMENTED COUNTER ELECTRODE

[75] Inventor: Paul Buro, Hamburg, Germany

[73] Assignee: U. S. Philips Corporation, New York, N.Y.

[22] Filed: Mar. 21, 1974

[21] Appl. No.: 453,365

[30] Foreign Application Priority Data

Mar. 23, 1973 Germany .............................. 2314506

[52] U.S. Cl. ............................ 346/74 E; 346/74 EH

[51] Int. Cl.$^2$ .................... G01D 15/06; G03G 17/02

[58] Field of Search ............. 346/74 ES, 74 E, 74 S, 346/74 SB, 74 EH, 74 SC; 178/6.6 A

[56] References Cited

UNITED STATES PATENTS

| | | | |
|---|---|---|---|
| 2,486,985 | 11/1949 | Ruderfer | 346/74 CM |
| 2,919,171 | 12/1959 | Epstein | 346/74 ES |
| 3,564,556 | 2/1971 | Tsukatani | 346/74 ES |
| 3,618,118 | 11/1971 | Lloyd | 346/74 E |

*Primary Examiner*—Bernard Konick
*Assistant Examiner*—Jay P. Lucas
*Attorney, Agent, or Firm*—Frank R. Trifari

[57] ABSTRACT

In conventional recorders using electric recording, sooner or later cloudiness of the record carrier occurs and prevents satisfactory recording. The cloudiness is due to the counter-electrode which cannot be manufactured so as to have a perfectly smooth surface. To avoid the said disadvantage the inventive counter-electrode is segmented, each segment being connected to a current-limiting resistor which either is discrete or forms part of the entire counter electrode.

4 Claims, 4 Drawing Figures

Figure 1:
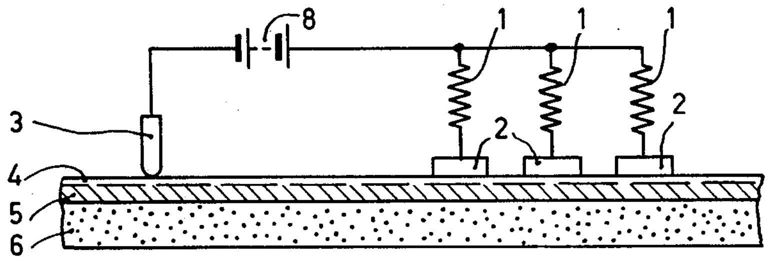

RECORDER FOR ELECTROSENSITIVE RECORD CARRIERS HAVING A SEGMENTED COUNTER ELECTRODE

The invention relates to a recorder for electro-sensitive record carriers which is provided with at least one recording electrode and a counter-electrode.

Recording paper coated with a thin layer of aluminium or zinc-cadmium is increasingly being used for printing analog or digital symbols. Recording is effected either continuously by means of direct current or discontinuously by means of pulsed currents. The recording electrode proper is a metal stylus having a diameter of a few tenths of a millimeter, at the tip of which the high current density causes the metal coating of the record carrier to melt or even, in the case of large currents, to burn off or to evaporate. The counter-electrode generally is a sliding surface or roller made of a metal of high electrical conductivity. Via this counter-electrode the record paper is grounded. The circuit between the recording electrode and the counter-electrode then is closed via the metal foil of the record carrier. If a plurality of recording electrodes is used, the symbols may be printed in the form of dots arranged in a matrix.

In the known recording devices, grounding the record carrier gives rise to difficulties and suffers from disadvantages due to the oxide film on the metal foil and to unevennesses of the surface of the counter-electrode.

Even when a roller coated with a high-quality contact material, for example gold, is used, natural unevennesses of the record carrier give rise to inhomogeneous current distribution between the two contact partners. As a result, spurious records are made at locations of high current density. In addition, after prolonged operation material of the foil will be transferred to the counter electrode and be welded to the surface thereof, so that the aforementioned disadvantage of spurious recording is aggravated. Such a recording cannot be controlled and results in clouding which eventually prevents true recording by the recording electrode and hence satisfactory legibility.

Increasing the force by which the counter-electrode is pressed against the record carrier does not improve the recording. The use of a metal brush as a counter-electrode provides a slight improvement in that the oxide film of the foil is removed and the large number of wires improves the current distribution. However, both methods, i.e. increasing the thrust force and the use of a metal brush, suffer from the considerable disadvantage that owing to the increased friction the amount of energy required for moving the record carrier is materially increased. This energy consumption is important, for example, in a portable battery-fed recorder. Furthermore accurate guiding of the record carrier provides difficulty.

It is an object of the present invention to provide a counter-electrode for use in a recorder for electro-sensitive record carriers such as to achieve even current distribution between the surfaces of the counter-electrode and the record carrier so that there is no need for increased pressure of the counter-electrode against the record carrier. According to the invention this is achieved in that the counter-electrode is made up of separate electrode segments, each segment being connected to a current-limiting resistor which either is discrete or forms part of the counter-electrode. The said segments with the associated resistors are electrically connected in parallel. The series resistors are proportioned so that breakdown through the oxide film of the foil is produced but the metal layer itself does not melt or burn off.

The said fundamental structure of the counter-electrode may be modified in various manners. For example, all the series resistors may be combined and used as a holder for the electrode elements. Alternatively all the electrode elements and the associated series resistors may be made of a homogeneous material, for example graphite. The unevennesses on the surface of such a counter-electrode then act as electrode segments and the parts supporting them act as series resistors. In this case also, all the segments and the associated resistors are electrically connected in parallel.

Figure 2:
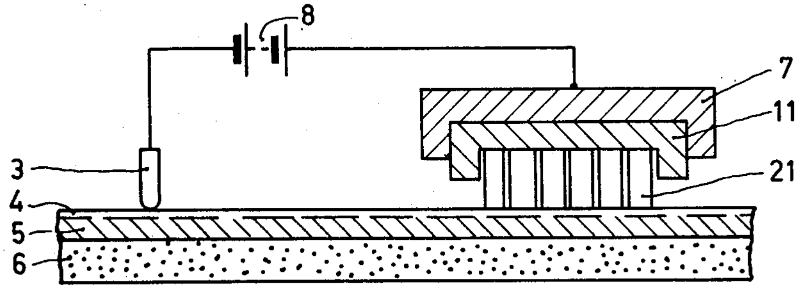
Figure 3:
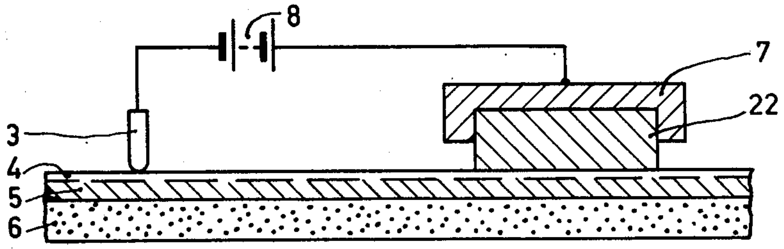
Figure 4:
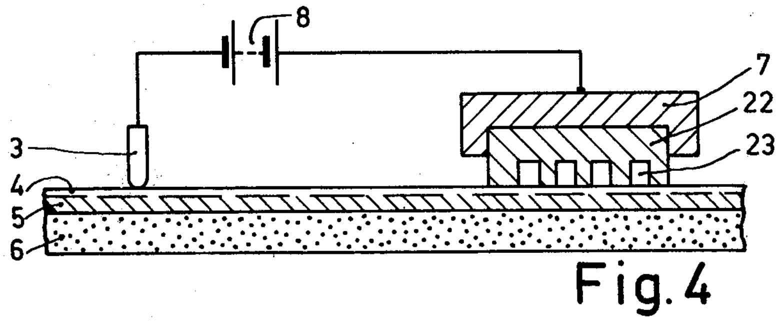

Embodiments of the invention will now be described, by way of example, with reference to the accompanying diagrammatic drawings, in which:

FIG. 1 shows the fundamental structure of a recorder according to the invention, and FIGS. 2 to 4 show modified embodiments thereof.

Referring now to FIG. 1, there is schematically shown a recorder for electrosensitive record carriers, only component parts essential for an understanding of the invention being indicated. Thus, no holders for the recording electrode and the counter-electrode and no means for moving the record carrier are shown, the direction of movement being assumed to be from the counter-electrode to the recording electrode.

The record carrier, the size of which is shown greatly exaggerated in the Figures, comprises a paper base 6 coated with a metal foil 5. This metal foil 5 is electrically conductive and generally has an oxide film 4. The oxide film 4 acts as an insulator in the electric circuit. By closing the circuit between a voltage source 8 and a recording electrode 3 in a manner not shown a symbol is recorded on the record carrier 6 in that the metal foil 5 is removed by melting or burning under the recording electrode 3. Depending upon the duration of energisation of the recording electrode 3 a symbol may be recorded in the form of a dot or a dash.

In contradistinction to the uniform construction of the counter-electrode in known recorders a counter-electrode divided into segments is used. In the embodiment shown in FIG. 1 the counter-electrode comprises three segments 2. Each electrode segment 2 is connected to a series resistor 1. The other ends of the resistors 1 are connected to the voltage source 8. The series resistors 1 are proportioned so that at the voltage used there is produced under an electrode segment 2 a breakdown through the oxide film 4 on the metal foil 5 of the record carrier 6, but that the metal coating 5 does not melt or burn off. Such melting or burning off of the metal coating initially is not effected at the recording electrode 3 either, as long as current passes through a single electrode segment 2 only. However, because all the electrode segments 2, which are decoupled from another by their series resistors 1, are connected in parallel, breakdown under several electrode segments 2 soon causes current of a strength required for recording to be supplied to the recording electrode 3. Obviously, a plurality of recording electrodes 3 may be arranged to form an array, for example, when an analog symbol is to be recorded by matrix printing.

In practice, for considerations of reliability a large number of electrode segments 2 will be used. Provision of a separate resistor for each segment is expensive.

FIGS. 2 to 4 show possibilities of more economical construction.

In the recorder shown in FIG. 2 the discrete electrode segments 21 are mounted in a holder 11 made of a material of suitable electrical resistivity. The arrangement of electrode segments 21 and resistive holder 11 is secured in an electrically conductive holder 7 which is electrically connected to the supply source 8.

In the recorder shown in FIG. 3 the electrode segments 21 and the associated series resistors are combined and consist of a material of suitable electrical resistivity, for example graphite. This material has proved eminently suitable both as a sliding electrode and as a rolling electrode. The surface of such a counter-electrode 22 is in direct contact with the surface of the foil 5 of the record carrier 6. Because the surface of the counter-electrode 22 by its very nature, for example by its microphysical properties and owing to its porosity and machining roughness, is not perfectly smooth but has unevennesses, the latter act as electrode segments and the regions of the counter-electrode 22 which support them act as series resistors 1. In this case also, all the segments 2 and resistors 1 are electrically connected in parallel.

The recorder shown in FIG. 4 is a modification of that shown in FIG. 3. The surface of the counter-electrode 22 is formed with additional macroscopic structures 23 in the form of incisions, bores, spiral grooves and the like so as to achieve accurate values or matching for the resistors 1 for each individual case, for example for record carriers of a special type, and also to increase the pressure per unit of area between the record carrier 5, 6 and the surface of the counter-electrode 22.

What is claimed is:

1. A recorder for an associated electrosensitive record carrier having at least one recording electrode and a counter-electrode, each being disposed on the same side of the electro-sensitive record carrier in spaced relation from each other, said counter-electrode comprising a plurality of discrete electrode segments electrically connected in parallel, a plurality of current limiting resistors, each of said segments being connected to one of said current limiting resistors, said recording electrode and said segments being disposed proximate to the electrosensitive paper.

2. A recorder as claimed in claim 1 further including a holder for each of said segments, said segments of said counter electrode being disposed in said holder, said holder being manufactured of a material which has an electrical conductivity lower than that of said electrode segments, each of said holders also carrying said current limiting resistor connected to said segment.

3. A recorder as claimed in claim 2 wherein said segments are depending and macroscopically visible.

4. A recorder as claimed in claim 1 wherein said electrode segments and said resistors consist of the same material and said segments have a plurality of discrete surface elements produced by the physical properties including the porosity and surface roughness thereof.

* * * * *